2,750,376

DEVELOPABLE TRISAZO DYES FOR COTTON

Orman B. Billings, Metuchen, N. J., assignor to E. I. du Pont de Nemours and Company, Wilmington, Del., a corporation of Delaware No Drawing. Application February 25, 1953,
Serial No. 338,900

6 Claims. (Cl. 260—173)

This invention relates to new developable trisazo dyestuffs for cellulosic material.

It is an object of this invention to provide novel developable dyes for cotton and regenerated cellulose, which yield, upon development, shades within the regions of bright red, Bordeaux and violet, and which are characterized generally by the following additional qualifications: developed dyeings of satisfactory brilliance, good fastness to washing, satisfactory discharge properties.

While it is true that developable disazo and trisazo dyes have been suggested or actually used in the art heretofore, none to my knowledge satisfy the above several properties in combination. For instance, the common "diazo" dyes when developed on the fiber usually give blues, yellows, greens, browns, blacks, and certain shades of red, depending on the developing component, but shades of Bordeaux and violet have been rather scarce. On the other hand, certain Bordeauxs and violets have been indicated in the art, but they generally suffer from dullness of shade or poor discharge qualities.

Now according to this invention, the aforegoing objects are achieved in combination by dyeing cotton or regenerated cellulose with trisazo dyes of the novel structure set forth hereinbelow, and then diazotizing the color on the fiber and coupling it to beta-naphthol.

The novel trisazo dyes of this invention are defined by the general formula—

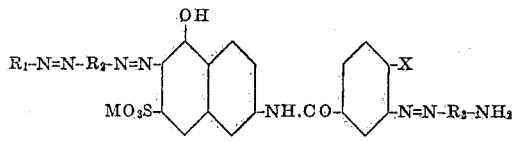

wherein $R_1$ is an aromatic sulfonic acid selected from the group consisting of benzene-monosulfonic acid, its homologs and halogen derivatives and naphthalene disulfonic acid; $R_2$ is a benzene radical of the group consisting of benzene and its methyl, methoxy, ethoxy and chloro derivatives, the two azo groups being attached to $R_2$ in para positions; $R_3$—$NH_2$ is an aromatic amine of the group consisting of aniline, its methyl, methoxy, ethoxy and chloro derivatives, alpha-naphthylamine and its monosulfo acids, and X stands for hydrogen and methyl. It will be understood that whatever sulfonic acids are mentioned hereinabove, water-soluble salts thereof are meant to be included, for instance the sodium, potassium or ammonium salts, the dyestuff most commonly being isolated as a sodium salt by the process of salting out.

It will be noted further in connection with the structure of my novel compounds, that they comprise in the middle a link derived from 3-aminobenzoyl- or 4-methyl-3-amino-benzoyl J-acid, the $NH_2$ and $CO$ groups in the aminobenzoyl radical being disposed in meta position with respect to each other. Also, the coupling component $R_3$ is of such a nature that the $NH_2$ group in it is disposed para to the azo group derived from said 3-aminobenzoyl component. These two factors appear to be of paramount importance in achieving the principal aims of this invention as hereinabove set forth.

My novel compounds may be synthesized by methods which are per se well known, for instance by diazotizing an amino-azo dye of formula $R_1$—$N{=}N$—$R_2$—$NH_2$, coupling to a meta-aminobenzoyl J-acid of the type hereinabove indicated (i. e., having H or $CH_3$ in the para position) isolating the disazo dye thus produced and coupling it to a component adapted to yield the radical $R_3$—$NH_2$ above defined coupled para to the $NH_2$ group. For the latter purpose, one may select the N-methyl omega sulfonate of aniline, chloroaniline, ortho-toluidine or ortho-anisidine, in which event the reaction mass is treated to hydrolyze off the sulfomethyl radical, or one may choose meta toluidine, cresidine, 2,5-dimethoxy or diethoxy aniline, or an alpha naphthalamine (having one $SO_3H$ group in the other nucleus or not), which have no substituents in the N-atom and therefore do not require a subsequent hydrolysis step.

Alternative procedures are also possible. For instance, one may diazotize m-aminobenzoyl J-acid first and couple it to a component of form $R_3$—$NH_2$, and then couple the monoazo compound thus obtained to a diazo-azo compound of formula $R_1$—$N{=}N$—$R_2$—$N{=}N$—$Cl$, wherein $R_3$, $R_1$ and $R_2$ have the same significance as above.

Without limiting this invention, the following examples are given to illustrate my preferred mode of operation. Parts mentioned are by weight.

Example 1

299 parts of 4-amino-azobenzene-4'-sodium sulfonate were dissolved in 600 parts of water at 60° C. At this temperature 250 parts of concentrated hydrochloric acid were added followed by 70 parts of sodium nitrite dissolved in about 400 parts of water. When diazotization was complete the slurry of the insoluble diazo compound was added to a solution of 377 parts of 2-(3-aminobenzoylamino) - 5 - naphthol - 7 - sulfonic acid (m-aminobenzoyl-J-acid) and 42 parts of sodium hydroxide and 400 parts of sodium bicarbonate in 3000 parts of water at room temperature. When the coupling was complete the solution was made alkaline to phenolphthalein and the disazo dye was salted out and filtered. The filter cake was dissolved in 10,000 parts of water at 60° C. and 56 parts of sodium nitrite were added. This solution was then run into 1000 parts of water containing 250 parts of concentrated hydrochloric acid with enough ice to keep the temperature between 10° and 15° C. When diazotization was complete, the excess nitrous acid was destroyed by adding a little sulfamic acid. A solution of 184 parts of N-methylaniline omega sodium sulfonate in 2000 parts of water was then added to the diazo compound and the excess mineral acidity was neutralized with 300 parts of sodium acetate. After about 1 hour the coupling was neutralized with 120 parts of sodium bicarbonate and the trisazo dye was salted out and filtered at 50° C. It was then dissolved in 15,000 parts of water with 600 parts of sodium hydroxide and held at 90° C. one-half hour. The dye, represented by the following formula, was filtered off and dried:

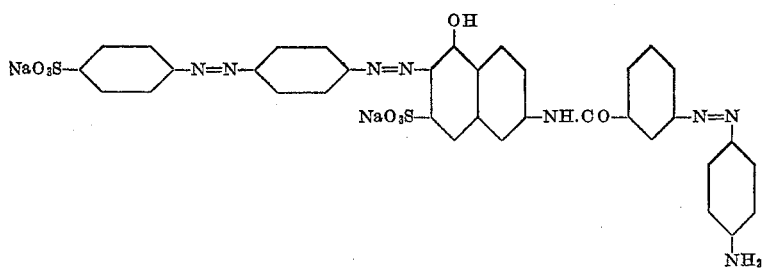

Cotton cloth was dyed with this product, then the dyed fiber was treated with nitrous acid and developed with an alkaline solution of beta naphthol. Portions of the dyed cloth were then printed separately with neutral and alkaline discharge pastes, respectively, to obtain white discharge prints. The red dyeing was appreciably brighter than the developed dyeing of the disazo dye obtained in the first coupling of this example, and the white discharge prints were also cleaner.

Example 2

The N-methyl omega sulfonate of m-chloraniline was used in place of aniline in Example 1. The developed dyeing from this trisazo base and beta naphthol was a bright red similar to that of Example 1.

Example 3

The isomeric 4-amino-azobenzene-3'-sulfonic acid was used in place of 4-amino-azobenzene-4'-sulfonic acid in Example 1. A similar bright red developed dyeing was obtained.

Example 4

The 4-amino-azobenzene-3'-sulfonic acid of Example 3 was replaced by its monochloro derivative obtained from diazotized metanilic acid and m-chloraniline. The trisazo dye obtained, when coupled on the fiber with beta naphthol, gave a similar bright red developed dyeing which gave clean white discharge prints.

Example 5

Following the procedure of Example 1, 227 parts of 3,2'-dimethyl-4-amino-azobenzene-4'-sodium sulfonate was diazotized and coupled with meta aminobenzoyl J-acid. This disazo dye was then diazotized and coupled with the omega sodium sulfonate of N-methylaniline. The methane sulfonic group was finally hydrolyzed. The trisazo dye base obtained gave a developed dyeing with beta-naphthol which was a Bordeaux, considerably brighter than that of the disazo dye obtained in the first coupling of this example.

When N-methyl o-toluidine omega sodium sulfonate was substituted for the omega sodium sulfonate of N-methylaniline in the last coupling, the developed dyeing was a bluer shade of Bordeaux.

When m-toluidine or p-xylidine was used in the last coupling, the final hydrolysis was not required. The products obtained gave developed dyeings similar to that of the o-toluidine dye.

Example 6

Following the procedure of Example 1, 3,2'-dimethyl-4-amino-azobenzene-4'-sodium sulfonate was diazotized and coupled with 2-(3-amino-4-methylbenzoylamino)-5-naphthol-7-sulfonic acid, then this disazo dye was diazotized and coupled with m-toluidine. The developed dyeings from this compound and beta-naphthol were Bordeaux in hue and were even brighter than those of Example 5. The trisazo base has the formula:

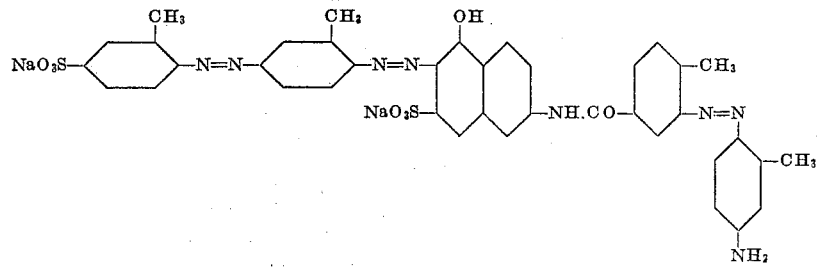

Example 7

The amino azo compound obtained from diazotized 2-aminotoluene-5-sulfonic acid and o-anisidine was diazotized and coupled with 2-(3-amino-4-methylbenzoylamino)-5-naphthol-7-sulfonic acid. This disazo dye was diazotized and coupled with N-methyl-o-anisidine omega sulfonate. After hydrolysis the resulting amino trisazo dye gave, with beta-naphthol, a bright red-violet developed dyeing on cotton and discharge pastes gave clean white prints. The product may be expressed by the formula: 2-aminotoluene-5-sulfonic acid→o-anisidine→2-(3-amino-4-methylbenzoyl-amino)-5-naphthol-7-sulfonic acid→o-anisidine, wherein the symbol → indicates successive diazotization of the amine compound obtained up to each symbol and coupling to the compound immediately succeeding the same.

When cresidine (2-methoxy-5-methylaniline) was used in the last coupling in place of N-methyl-o-anisidine omega sulfonate, the developed dyeing was a slightly bluer red-violet.

Example 8

The amino azo compound obtained from 2-naphthylamine-6,8-disulfonic acid and cresidine was diazotized and coupled with 2-(3-amino-4-methylbenzoylamino)-5-naphthol-7-sulfonic acid. This disazo compound was then diazotized and coupled with 2,5-dimethoxyaniline. The trisazo dye thus obtained gave, with beta-naphthol, a developed dyeing on either cotton or rayon which was bluer and brighter than previously known diazo blue-violets, such as that of Example 1 of U. S. Patent 1,716,098. The trisazo dye of this example has the formula:

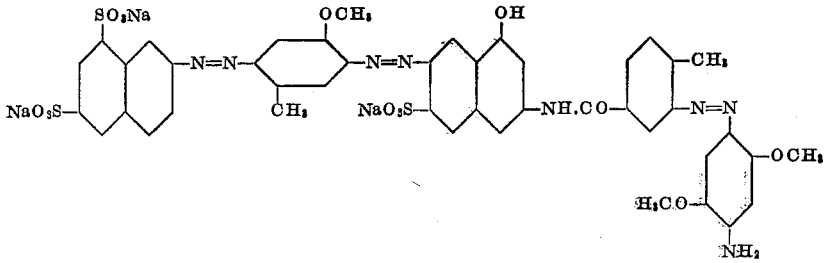

When analogous trisazo dyes were made using as last component 2,5-diethoxyaniline, N - methyl - o - anisidine omega sodium sulfonate (with final hydrolysis) or cresidine, redder and brighter developed violets were obtained. When on the contrary the last coupling was made with alpha-naphthylamine, 1-aminonaphthalene-6-sulfonic acid or 1-aminonaphthalene-7-sulfonic acid, very blue violet developed dyeings were obtained. Clean white discharge prints were obtained from the developed dyeings.

*Example 9*

303 parts of 2-aminonaphthalene-6,8-disulfonic acid were dissolved in 3000 parts of water with 40 parts of sodium hydroxide. This was diazotized by the addition of 300 parts of concentrated hydrochloric acid and 70 parts of sodium nitrite dissolved in 250 parts of water, keeping the temperature below 10° C. by the addition of ice. A solution of 160 parts of 2,5-dimethoxyaniline and 100 parts of concentrated hydrochloric acid in 1000 parts of water was run into a solution of 640 parts of sodium bicarbonate in 2000 parts of water and the slurry of diazo compound was then run into this. The coupling mass was made strongly alkaline, the monoazo compound was then salted out and filtered off. It was then redissolved in 2000 parts of water and the solution was clarified by heating with charcoal followed by filtration. 60 parts of sodium nitrite were added to this solution and it was run into 250 parts of concentrated hydrochloric acid diluted with 1000 parts of water at room temperature. The diazo compound was then run into a solution containing 330 parts of 2-(3-amino-4-methylbenzoylamino)-5-naphthol-7-sulfonic acid, 34 parts of sodium hydroxide and 130 parts of sodium carbonate in 3000 parts of water. The disazo dye was salted out at 60° C. and filtered off. It was then dissolved in 10,000 parts of water at 70° C. together with 56 parts of sodium nitrite. This solution was run into 320 parts of concentrated hydrochloric acid in 1000 parts of water at 15° C. The diazo suspension thus obtained was neutralized with sodium acetate and to it was added a solution of the sodium salt of 190 parts of 1–7 Cleve's acid (1-aminonaphthalene-7-sulfonic acid) in 4000 parts of water. When coupling was complete the solution was made slightly alkaline and the trisazo dye was salted out at 60° C. and filtered off. When this product was dyed on cotton, then diazotized and developed with beta-naphthol, there was obtained a very reddish-blue dyeing.

It will be understood that the details of the above examples may be varied within the skill of those engaged in this art. Thus, in addition to the compounds indicated for the first diazo component ($R_1$—$NH_2$) in the above examples, any of the following may be used: 2-aminotoluene-4-sulfonic acid, 5-aminotoluene-2-sulfonic acid, 4-aminotoluene-2-sulfonic acid, 4-aminotoluene-3-sulfonic acid, 2-amino-5-chlorobenzene-sulfonic acid, 3-amino-6-chlorobenzene-sulfonic acid, 2-naphthylamine-4,8-disulfonic acid, 1-naphthylamine-3,6-disulfonic acid and 1-naphthylamine-4,7-disulfonic acid. In lieu of those indicated for the second component ($R_2$—$NH_2$), the following may also be used: m-toluidine, p-xylidine, 2,5-diethoxyaniline and o-phenetidine. As last component, in addition to those named in the examples, phenetidine may be used.

Finally, even though aminobenzoyl J-acid and its 4-methyl derivative have been indicated as preferred, the following are nevertheless also useful: 4-methoxy-3-amino-benzoyl J-acid and 4-chloro-3-aminobenzoyl J-acid. The chief difference between these and those is that the discharge qualities of the developed trisazo dyes in the case of the 4-methoxy and 4-chloro derivatives are not so good as in the case of the 4-methyl and the 4-hydrogen-3-aminobenzoyl J. The colors nevertheless possess good brilliance, and are very satisfactory where no discharge printing of the dyed fabric is contemplated.

While my novel compounds of the above general formula generally give improved brightness compared to known developable azo dyes of the same shades, certain members of my novel group of compounds may nevertheless be superior to other members in this respect. Best results as regards brightness are obtained by judicious balancing or matching of the components on the two sides of the benzoyl-J component. For instance, if $R_3$ is naphthalene or a sulfonic acid of naphthalene, it is best to select a naphthalene disulfonic acid as $R_1$. On the other hand, if $R_2$ bears methyl, methoxy or chloro substitutents, it is best to select for $R_3$ a benzene compound bearing the same substituents.

I claim as my invention:

1. The acid form and water-soluble salts of an azo compound of the general formula

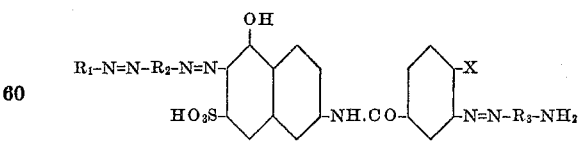

wherein $R_1$ is an aromatic sulfonic acid selected from the group consisting of benzene-monosulfonic acid, its methyl and chloro derivatives and naphthalene disulfonic acid; $R_2$ is a benzene radical of the group consisting of benzene and its methyl, methoxy, ethoxy and chloro derivatives, the two azo groups being attached to $R_2$ in para positions; $R_3$—$NH_2$ is an aromatic amine coupled in the para position and selected from the group consisting of aniline, its methyl, methoxy, ethoxy and chloro derivatives, alpha-naphthylamine and its monosulfo acids, while X stands for a member of the group consisting of hydrogen and methyl.

2. The trisazo compound of the formula

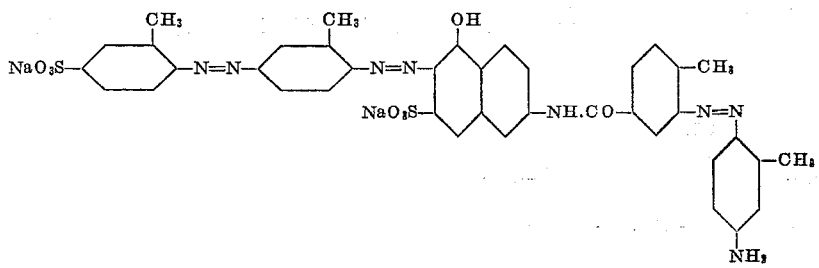

3. The trisazo compound indicated by the formula 2 - aminotoluene - 5 - sulfonic acid → o-anisidine → 2-(3-amino-4-methylbenzoylamino)-5-naphthol-7-sulfonic acid → o-anisidine, wherein the symbol → indicates successive diazotization of the amine compound obtained up to each symbol and coupling to the compound immediately succeeding the same.

4. The trisazo compound of the formula

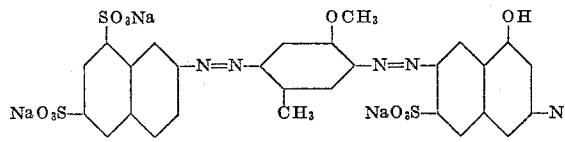

5. The trisazo compound of formula as indicated in claim 4 except that the last component is replaced by cresidine.

6. The dyes obtained by diazotizing and developing with beta naphthol a trisazo compound of the formula

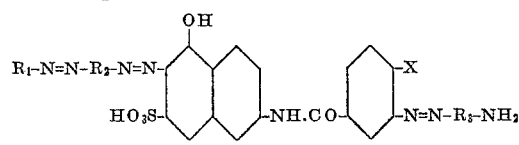

wherein $R_1$ is an aromatic sulfonic acid selected from the group consisting of benzene-monosulfonic acid, its methyl and chloro derivatives and naphthalene disulfonic acid; $R_2$ is a benzene radical of the group consisting of benzene and its methyl, methoxy, ethoxy and chloro derivatives, the two azo groups being attached to $R_2$ in para positions; $R_3$—$NH_2$ is an aromatic amine coupled in the para position and selected from the group consisting of aniline, its methyl, methoxy, ethoxy and chloro derivatives, alpha-naphthylamine and its monosulfo acids, while X stands for a member of the group consisting of hydrogen and methyl.

References Cited in the file of this patent
UNITED STATES PATENTS

| | | |
|---|---|---|
| 1,716,098 | Woodward | June 4, 1929 |
| 2,155,685 | Rossander | Apr. 25, 1939 |
| 2,298,303 | Misslin et al. | Oct. 13, 1942 |